Jan. 16, 1951  H. P. COMPTON  2,538,146
ELECTRICALLY OPERATED VEHICLE SAFETY LIGHT
Filed June 23, 1948  2 Sheets-Sheet 1
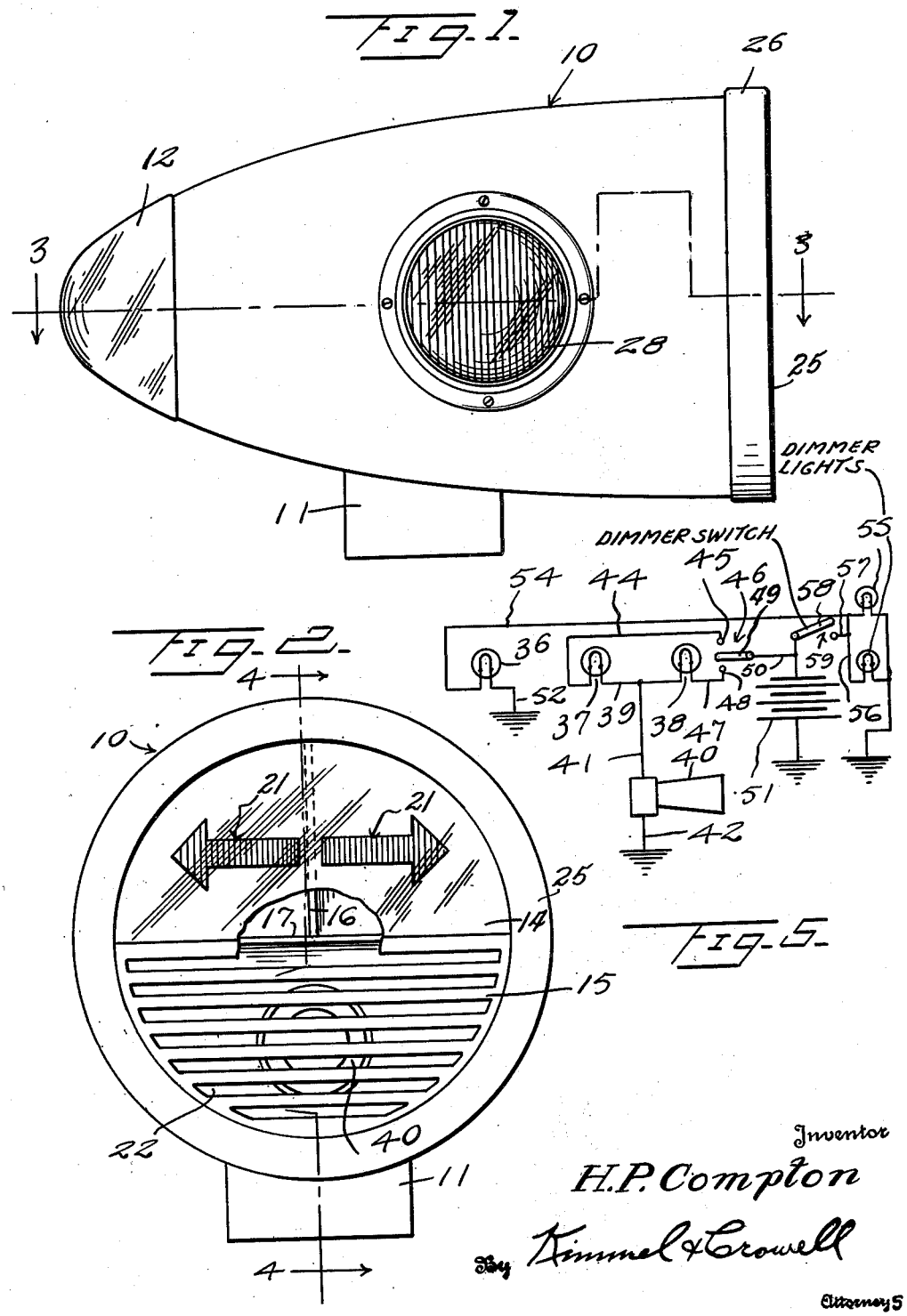

Jan. 16, 1951 H. P. COMPTON 2,538,146
ELECTRICALLY OPERATED VEHICLE SAFETY LIGHT
Filed June 23, 1948 2 Sheets-Sheet 2
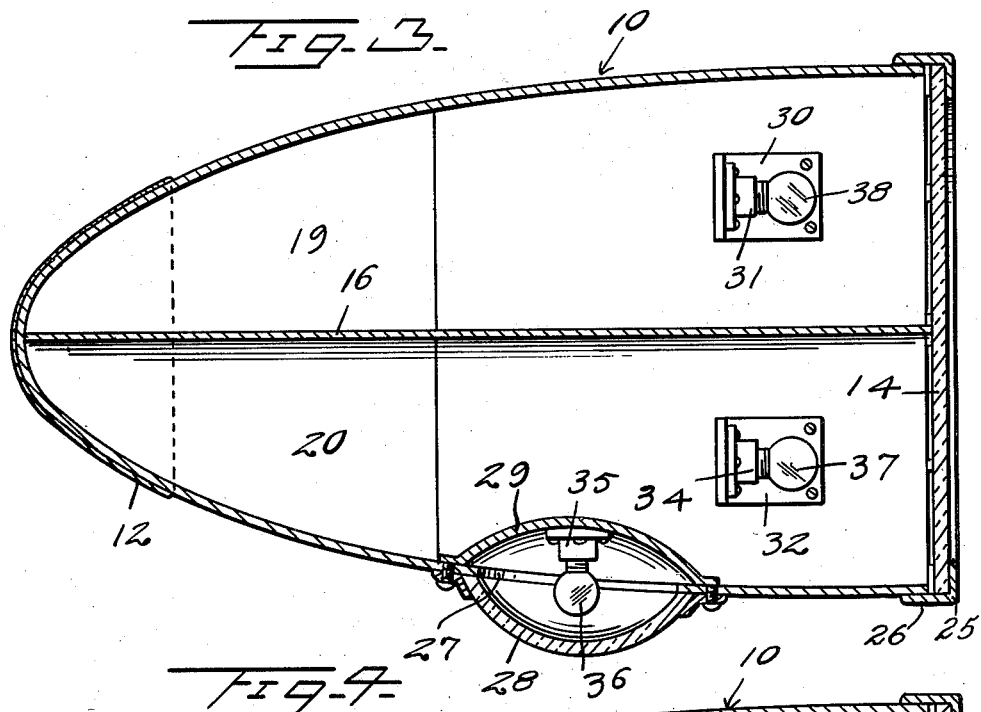
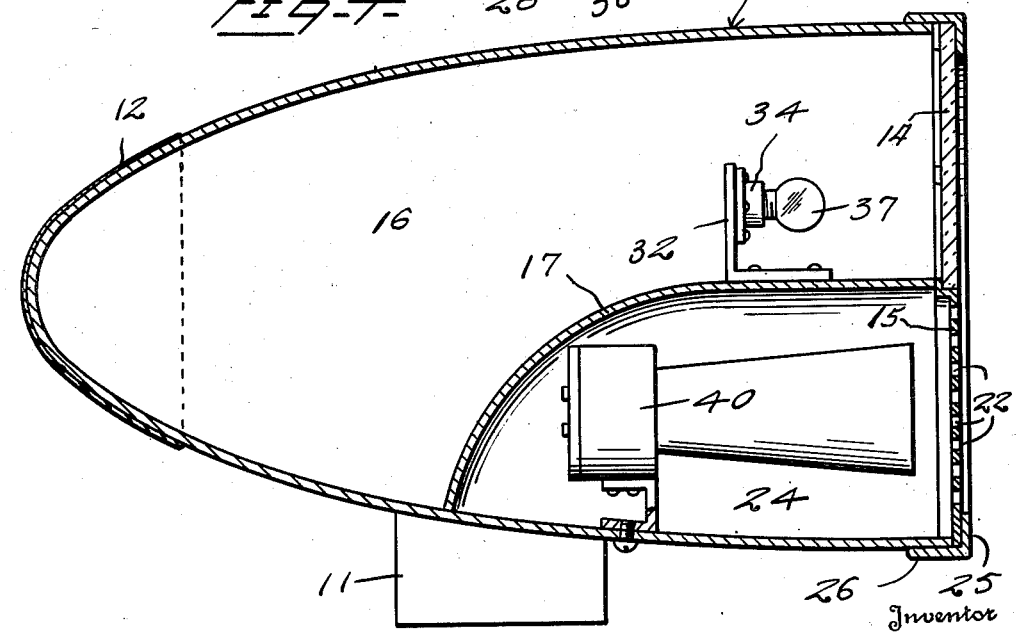
H. P. Compton
By Kimmel & Crowell
Attorneys Patented Jan. 16, 1951

2,538,146

UNITED STATES PATENT OFFICE 2,538,146

ELECTRICALLY OPERATED VEHICLE SAFETY LIGHT

Henry P. Compton, Abilene, Tex., assignor of one-tenth to Vic Payne, Jr., Abilene, Tex.

Application June 23, 1948, Serial No. 34,670

1 Claim. (Cl. 177—7)

This invention relates to automobile lighting equipment and more particularly to a safety light accessory for vehicles.

It is an object of this invention to provide an automobile light accessory as a safety lamp to be used as a guide light, head light, side light, fog light, tail light, warning signal and it may be used for other purposes such as a parking light or danger signal light and will be secured to the front or rear on the left side preferably, or could be incorporated in the design of new cars at any desirable position.

Another object of this invention is to provide a safety lamp co constructed and arranged to cast a strong light a few feet to the left of an automobile enabling an approaching vehicle to clearly see the road to the side of the car so equipped. The lamp is designed to eliminate the dangerous dark spot that always exists as two cars approach each other with their head lights on, and then the drivers will be able to see the edge of the curb or a person, animal or vehicle that may be on the side of the road. The safety light is preferably connected in the lighting circuit for operation when the head light dim circuit is completed. The safety light will eliminate the hazard of a "one eyed" car on a dark highway by illuminating the road in the direction of the oncomer.

Still another object of this invention is to provide an improved safety light for warning a following vehicle that the car ahead is about to turn and indicating the direction of the turn. An audible sound is initiated at the same time as the visual signal thus offering a double signal to the following vehicle of a change in direction of the car ahead. The horn is connected to be actuated at the time either turning light is lit, and the sound is directed to the rear of the car.

A further object of this invention is to provide a reflector signal to reflect the light of an approaching vehicle in the case of a car being stopped on the road with the electric lights turned off.

With the above and other objects in view, my invention consists in the arrangement, combination and details of construction disclosed in the drawings and specification, and then more particularly pointed out in the appended claim.

In the drawings,

Figure 1 is a side elevation of an automobile safety light accessory constructed according to an embodiment of my invention;

Figure 2 is a rear elevation;

Figure 3 is a horizontal section taken on the line 3—3 of Figure 1;

Figure 4 is a vertical section taken on the line 4—4 of Figure 2;

Figure 5 is a diagrammatic view of the electrical circuit for the light.

Referring to the drawings, the numeral 10 designates generally a hollow body or housing for containing the light of the safety lamp of this invention. The housing or body 10 is substantially elliptical in configuration having an open end. A base as 11 is fixed to or formed on the lower end of the housing 10 and provides an attaching means for securing the light to the fender or body of a vehicle. The body 10 is adapted to be made of metal, plastic or other suitable material and the inner surface thereof is of a natural silver color or will be provided with a silvered surface so that the interior of the body 10 will provide a reflector for the lights contained therein. A reflector surface 12 is provided at the forward end of the body 10 and substantially covers the apex of the parabolic configuration of the body at this end. The open rear end of the body 10 is partially closed by a lens 14 at the upper side thereof and an apertured wall 15 below the lens.

A vertical wall as 16 is fixed in the body 10 and extends along its length. The wall 16 is positioned exactly in the center of the body 10 and extends along its axis. The wall 16 separates the interior of the body 10 into a pair of chambers 19 and 20 within which turn indicating lights are adapted to be enclosed. A horizontal wall 17 is positioned towards the rear of the housing 10 and intersects the vertical wall 16 at its rear end. The horizontal wall 17 extends across the housing 10 from one side to the other being attached to the inner surface of the side walls thereof. The rear end of the horizontal wall 17 is inclined downwardly so that the rear end of the wall 17 may be fixed to the bottom wall of the housing 10 intermediate the length thereof. The vertical wall 16 is broken away below the horizontal wall 17 so that the wall 17 defines a third chamber within the housing 10. The third chamber extends across the housing at the rear end thereof providing a space for a horn or other audible signal device. The lens 14 closes the rear end of the chambers 19 and 20 on the opposite sides of the vertical wall 16 above the horizontal wall 17. A metal plate comprises the operational wall closing the open end of the housing 10 below the lens 14 and the plate 15 is provided with a plurality of apertures 22 so that the audible signal from the horn or other device contained within the chamber 24 below the horizontal wall 17 will not be restrained. A cap or rim 25 having a forwardly extending flange 26 engages about the body 10 at the rear end thereof for securing the lens 14 and plate 15 in place.

One side wall as the left wall of the body 10 is formed with an opening 27. An outwardly bowed lens 28 is secured to the body 10 about the opening 27 for directing the light from a bulb within the housing to one side of the housing and the vehicle on which it is attached. A reflector plate 29 which is inwardly bowed as clearly shown in Figure 3 of the drawings is also secured about the opening 27 within the housing 10.

An L-shaped bracket 30 is fixed on the upper surface of the horizontal wall 17 within the chamber 19 for mounting an electric light bulb socket as 31 on one side of the vertical wall 16. A second L-shaped bracket 32 is fixed on the top surface of the horizontal wall 17 on the other side of the vertical wall 16 in the chamber 20 to provide a support for another socket 34 for supporting another turn indicating lamp therein. A socket 35 is fixed on the reflector plate 29 for mounting an electric light bulb 36 within the opening 27 in the side wall of the housing 10. Suitable indicia as indicated by the numeral 21 are contained on the lens 14 for indicating the direction of a turn to be indicated by the illumination of a selected one of the lights in the sockets 31 or 34.

In Figure 5 there is shown a preferred wiring diagram for the light bulbs and horn contained within the housing 10. The two turn indicating lights 37 and 38 are connected together on one side by a wire 39. The horn 40 is connected by wire 41 to the lead 39 and the other side of the horn circuit is connected by a lead 42 to a suitable ground connection. The light bulb 37 is connected by a lead 44 to a contact post 45 of a turn indicating selector switch 46 to be mounted or installed in the vehicle at a selected position. A lead 47 connects the light bulb 38 to a contact post 48 of the switch 46. The movable contact member 49 of the switch 46 is connected by a suitable lead 50 to the battery indicated by the numeral 51. The side illuminating light 36 is grounded by a lead 52 on one side and is connected by a lead 54 to the dimmer circuit of the automobile head lights indicated by the numeral 55. The dimmer bulbs of the head lights are connected in parallel by a lead 56 and a fixed contact member 57 is operatively connected to the lead 56. The movable contact member 58 of the head light dimmer switch 59 is engageable with the contact 57 and is connected on the other side to the battery and to the lead 50 of the turn indicating switch 46.

In the use and operation of the automobile safety lamp, the side light 36 will be illuminated when the switch 59 is closed for completing the circuit to the head light dimmer. The side light 36 will provide for the illumination of the automobile on the left side so that the road to the left of the vehicle so equipped and the left side of the car will be illuminated and visible to approaching cars. Upon closing the switch 46 to a selected one of the contacts 45 or 48 for illuminating one of the turning lights 37 and 38 the completion of the circuit to either one of the turning lights will complete the circuit through the horn 40 so that a double indication of the desire to turn will be afforded to vehicles following the automobile equipped with this safety lamp. The lights 37 and 38 thus illuminated will be visible through the lens 18 and the sound of the horn 40 will be audible through the apertured plate 21.

I do not mean to confine myself to the exact details of construction herein disclosed but claim all variations falling within the purview of the appended claim.

What is claimed is:

A safety accessory for automobiles comprising an elliptical housing open at one end, a horizontal partition extending from said open end to an intermediate portion of said housing and terminating in an arcuate partition intersecting the side wall of said housing, defining a horn containing chamber, a vertical partition extending along the center line of said housing from the open end to the closed end thereof above said horizontal partition defining light containing chambers, a light secured to the upper side of said horizontal partition on each side of said vertical partition, a lens closing the open end of said light containing chambers, an apertured plate closing the open end of said horn containing chamber, means forming an aperture in a side wall of at least one said light containing chambers, a concave plate closing said aperture interiorly of said housing, a light socket on said plate, a lens closing said aperture exteriorly of said housing, and a parabolic reflecting surface exteriorly positioned on the outer surface of the closed end of said housing.

HENRY P. COMPTON.

REFERENCES CITED

The following references are of record in the file of this patent:

UNITED STATES PATENTS

| Number | Name | Date |
|---|---|---|
| 1,121,424 | Voss | Dec. 5, 1914 |
| 1,134,360 | Walker | Apr. 6, 1915 |
| 1,497,760 | Lyon et al. | June 17, 1924 |
| 2,220,222 | Duncan | Nov. 5, 1940 |